METHOD OF MANUFACTURING ELECTRICAL CONNECTORS
Filed Nov. 2, 1964
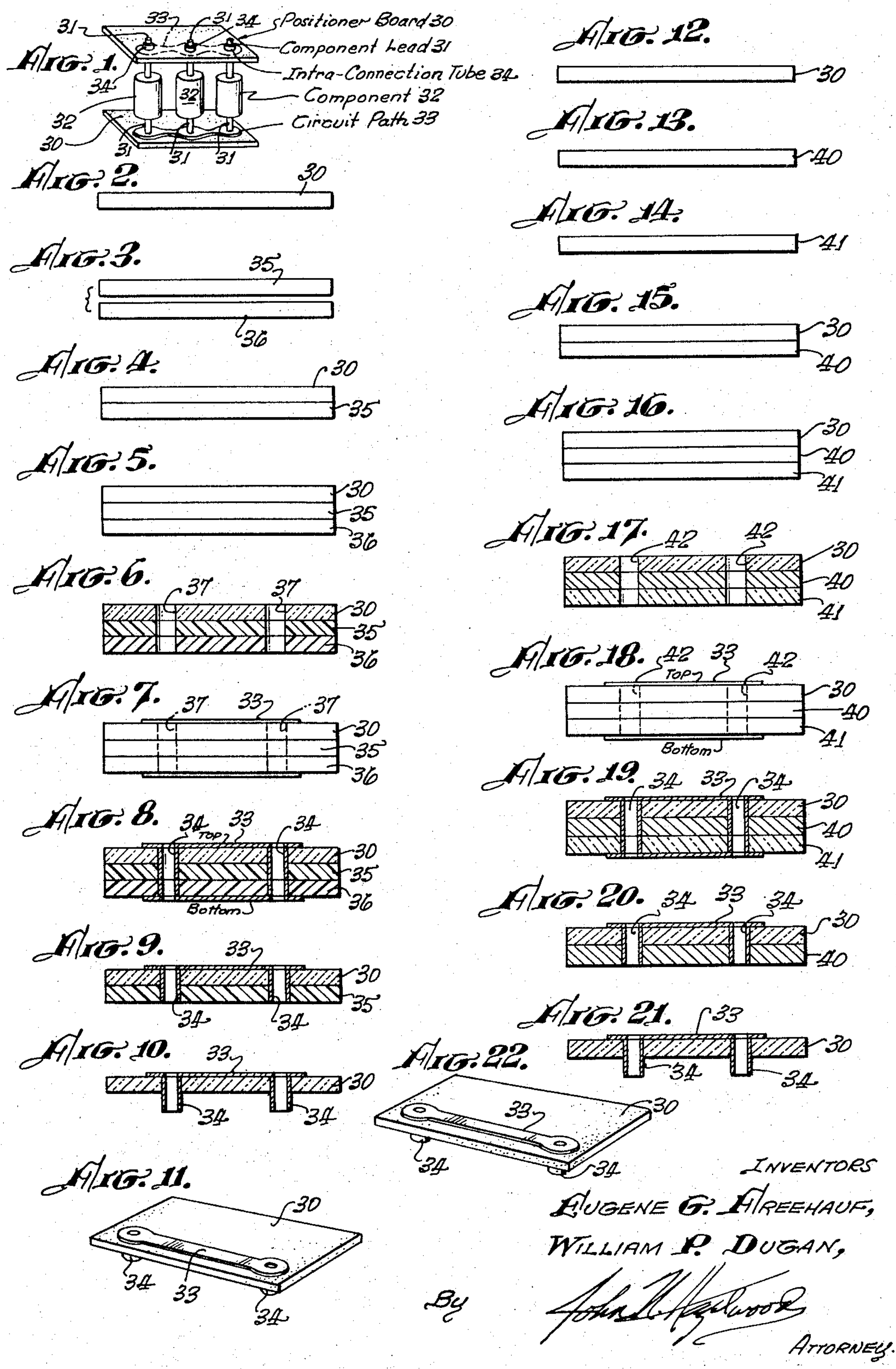
FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, FIG. 18, FIG. 19, FIG. 20, FIG. 21, FIG. 22
INVENTORS
EUGENE G. FREEHAUF,
WILLIAM P. DUGAN,
By [signature]
ATTORNEY.

3,370,351
METHOD OF MANUFACTURING ELECTRICAL CONNECTORS

Eugene G. Freehauf, Ontario, and William P. Dugan, Monterey Park, Calif., assignors to General Dynamics Corporation, Pomona, Calif., a corporation of Delaware Filed Nov. 2, 1964, Ser. No. 408,283
14 Claims. (Cl. 29—625)

ABSTRACT OF THE DISCLOSURE

Broadly, the disclosure relates to a method of making integral conductor paths and through-hole tubes in circuit positioner boards on which components are to be mounted. According to the method, a temporary backing material is applied to the board; holes are formed through the assembly; the circuit is printed on the board; the holes are through-plated along with the desired circuit; and finally the backing material is stripped from the assembly to leave through-hole tubes extending from the back of the positioner board.

This invention relates to electrical connectors and more particularly to a method of making electrical connectors utilized to intra-connect various elements of electrical or electronic apparatus, such as modules, which are adapted to be mounted within a layer of insulation material.

Devices which serve as media for attaching electronic component leads to a circuit path in apparatus such as 3D module construction are known. The end result of such devices is a series of circuit paths on a positioner or carrier board with tubes at appropriate places in continuity with these circuits. The function of these tubes is to receive electronic component leads so that they may be connected to the circuit path as used in module construction.

The present invention has for its purpose an improved method of manufacturing the above described devices and has the following advantages over the presently known construction thereof: (1) the tubes are manufactured as an integral part of the positioner board, which stronger units will stand more abuse; (2) there is no chance of mismatch between the hole in the positioner board and the tube as they are one and the same; (3) no "hard tooling" is necessary for limited production as all circuits and tube locations can be transposed directly from engineering drawings; (4) tube height is easy to control because it originates from stable material and a variation in heights, for different applications, can be made easily; and (5) tube diameters can be varied to accept different size component leads.

Therefore, it is an object of this invention to provide a method of manufacturing electrical connectors.

A further object of the invention is to provide a unique method of manufacturing devices which serve as media for attaching electronic component leads.

Another object of the invention is to provide a manufacturing method for producing integral carrier boards and electronic connector devices.

Another object of the invention is to provide a method of manufacturing devices which serve as media for attaching component leads of electronic modules.

Another object of the invention is to provide a method of manufacturing devices which contain at least one circuit path on a carrier board with tubes integral therewith and at appropriate places in continuity with the circuit path.

Other objects of the invention, not specifically set forth above, will become readily apparent from the following description and accompanying drawings wherein:

FIG. 1 is a view illustrating an application of an electrical connector produced by the invention method;

FIGS. 2–11 illustrate the steps of a manner for carrying out the invention; and

FIGS. 12–22 illustrate the steps of a preferred manner for carrying out the invention.

Referring now to the drawings, FIG. 1 illustrates an application of the invention wherein positioner boards 30 made in accordance with the novel method are intra-connected with leads 31 of a plurality of components 32. Integral with each board 30 are a circuit path 33 interconnecting the components leads 31 and intra-connection tubes 34 of material such as nickel through which component leads 31 extend. The circuit path 33 in the upper board is underneath the board as shown in dotted lines while the connection tubes 34 in the lower board extend under the board and thus are not shown but are the same as shown in the upper board. Component leads 31 and tubes 34 are interconnected by welding across the diameter of the tube which provides two welded areas at the inside interfaces of the wall of the tube and the component lead thus giving greater reliability over the single tangential weld obtained with the conventional methods. Also, with this type of connection, the welder electrodes are normally in contact with the same type of material, namely, the tube wall, regardless of the type of material from which the component leads are made.

The sequence of operation of one manner of carrying out the novel method illustrated in FIGS. 2–11 is as follows:

(1) Clean one side of a copper clad glass epoxy board 30 (FIG. 2) to remove any contamination.

(2) Scrub both sides of two polystyrene sheets 35 and 36 (FIG. 3), each of a thickness of the tube height, to remove any contamination.

(3) Bond the prepared surface of board 30 and sheet 35 with an adhesive that responds to plating (FIG. 4).

(4) Bond prepared surfaces of polystyrene sheets 35 and 36 together with an adhesive that is non-responsive to plating (FIG. 5).

(5) Drill holes 37 of appropriate size (approximately 0.010 larger than component lead 31 diameter) through the three bonded pieces at those places requiring a tube in the circuit (see section in FIG. 6).

(6) Prepare drilled assembly for and electroless copper plate all surfaces.

(7) Electroplate all surfaces with copper (approximately 0.0001 inch thick).

(8) Silk screen in conventional manner a circuit path on both top and bottom sides of the assembly, the top circuit being the actual circuit, the bottom circuit being a dummy (FIG. 7), the dummy circuit being essential to ensure even plating current on both sides of the assembly and thus proper plating of drilled holes which forms the tube walls.

(9) Plate with nickel, or equivalent material, all non-silk screened and drilled surfaces to the required thickness to define circuit path 33, and define tubes 34 having walls of approximately 0.004 inch (FIG. 8).

(10) Remove the bottom polystyrene sheet 36 and discard. Remove any remaining adhesive from assembly with suitable solvent (FIG. 9). Note that tubes 34 have terminated at the lower surface of polystyrene sheet 35, the bottom sheet 36 thus ensuring the proper end configuration of the tubes 34.

(11) Remove the remaining polystyrene sheet 35 by immersing in a vapor degreaser (FIG. 10).

(12) Remove adhesive on remaining assembly by immersing in suitable solvent.

(13) Remove resist from the silk screening operation by immersing in suitable solvent.

(14) Remove copper from clad board 30 and around tubes 34 by immersing assembly in copper stripper (FIG. 11), thus producing an end product wherein the nickel tubes 34 are made integral with a combination nickel and copper circuit path 33.

The sequence of operation of the preferred method of the invention illustrated in FIGS. 12–22 is as follows:

(1) Bond a sheet of epoxy glass laminate (FIG. 12), having a cured thickness of that of the positioner board 30, to an aluminum sheet 40 (FIG. 13) having the same thickness as the height of tubes 34 (FIG. 15).

(2) Bond a sheet of glass epoxy board 41 (FIG. 14) or equivalent (approximately 0.015 inch thick) to aluminum sheet 40 (FIG. 16) with an adhesive that is non-responsive to plating.

(3) Drill holes 42 of appropriate size (approximately 0.010 inch larger than component lead diameter) through the three bonded pieces (30, 40, 41) at those places requiring a tube 34 in the circuit (see section in FIG. 17).

(4) Electro copper plate all exposed aluminum surfaces to approximately 0.0002 inch thick.

(5) Electroless copper plate all surfaces to approximately 0.0001 inch thick.

(6) Electro copper plate all surfaces to approximately 0.0017 inch thick.

(7) Silk screen in conventional manner a circuit path on both top and bottom sides of the assembly, the top circuit being the actual circuit, the bottom circuit being a dummy (FIG. 18).

(8) Electro plate with nickel, or equivalent, all non-silk screened and drilled surfaces to the required thickness to define circuit path 33, and define tubes 34 having walls of approximately 0.004 inch (FIG. 19).

(9) Remove bottom epoxy board 41 and discard (FIG. 20). Remove any remaining adhesive from the assembly. Note that tubes 34 terminate at the aluminum surface 40.

(10) Remove resist from the silk screening operation by cleaning with suitable solvent.

(11) Dissolve aluminum sheet 40 by immersing in sodium hydroxide (FIG. 21).

(12) Remove copper from clad board 30 and around tubes 34 by immersing in copper stripper (FIG. 22), thus producing an end product wherein the nickel tubes 34 are made integral with positioner board 30 and with the combination copper and nickel circuit path 33.

The final product illustrated in FIG. 22 is essentially identical with that illustrated in FIG. 11. The configuration of circuit path 33 is determined by the specific requirements, number of component leads, etc. of any specific application.

It has thus been shown that the invention provides a unique method of manufacturing media for attaching electronic component leads to a circuit path having the following advantages: (1) regardless of component lead material, the welder electrodes are always in contact with the same type of material, i.e., the nickel, or equivalent material, in the tube wall which reduces sharply the number of variations in weld schedules for a given system; (2) the tubes are self-aligning with respect to the component leads, eliminating the location and slippage problems which occur when welding round leads to flat ribbon or circuit tabs, and reducing considerably the labor or assembly time; (3) pre-established interconnect circuitry eliminates the possibility of operator-caused wiring errors; and (4) tube welding gives greater reliability by providing two welds inside each tube, instead of the single tangential weld obtained with other systems.

While specific types of materials have been set forth hereinbefore, it is understood that other materials which fulfill the requirements may be utilized.

Although particular embodiments of the invention have been illustrated and described, modifications will become apparent to those skilled in the art, and it is intended to cover in the appended claims all such modifications as come within the spirit and scope of the invention.

What we claim is:

1. The method of manufacturing electric connectors of the type having an integral positioner board, at least one circuit path and connector members comprising the steps of bonding together three layers of selected material, drilling holes of predetermined diameter and number through the thus bonded layer assembly, electroless copper plating all surfaces, electro copper plating all surfaces to a desired thickness, defining a circuit on the top and bottom surfaces of the assembly, electroplating with a conductive material predetermined surfaces which include at least the drilled surfaces and to define the required tube wall thickness, removing the bottom layer of material and any associated bonding material, removing from the top surface the resist from the circuit defining operation, removing the middle layer of material and associated bonding material thus leaving the tubes exposed, and removing the copper from the upper layer of material and from around the tubes.

2. The method of making nickel tubes integral with a positioner board and with combination copper and nickel circuits comprising the steps of bonding together a copper clad glass epoxy board and a sheet of polystyrene with an adhesive that responds to plating, bonding another sheet of polystyrene to the first mentioned sheet with an adhesive that is non-responsive to plating, forming holes of appropriate size through the three bonded pieces at the places requiring a tube in the circuit, preparing for and electroless copper plating all surfaces, electroplating all surfaces with copper, silk screening a circuit on the top and bottom of the assembly, plating with nickel certain surfaces of the required thickness thus forming the tube walls, removing the last bonded polystyrene sheet and associated adhesive, removing the remaining polystyrene sheet and the associated adhesive, removing resist from the silk screening operation, and removing copper from the positioner board and from around the tubes.

3. The method defined in claim 2, wherein the holes formed in the assembly are approximately 0.010 inch larger than the diameter of a component lead adapted to be associated therewith.

4. The method defined in claim 2, wherein all the surfaces of the assembly are electroplated with copper of a thickness of approximately 0.0001 inch.

5. The method defined in claim 2, wherein the walls of the tubes are nickel plated to a thickness of approximately 0.004 inch.

6. The method of making nickel tubes integral with a positioner board and with combination copper and nickel circuits comprising the steps of bonding a cured epoxy glass laminate positioner board to a sheet of aluminum of the same thickness as the desired tube height, bonding a second glass epoxy board to the aluminum sheet with an adhesive that is non-responsive to plating, drilling holes of appropriate size through the bonded three piece assembly at the places requiring a tube in the circuit, electro copper plating all exposed aluminum surfaces, electroless copper plating all surfaces of the assembly, electro copper plating all surfaces of the assembly, silk screening a circuit on both the top and bottom of the assembly, electro plating with nickel at least the hole surfaces of the assembly to the required thickness thus forming the tube walls, removing the bottom epoxy board and the associated non-responsive adhesive thus forming the terminal ends of the tubes, removing resist from the silk screen operation, dissolving the aluminum sheet, and removing the copper from the positioner board and from around the tubes.

7. The method defined in claim 6, wherein the holes drilled in the assembly are approximately 0.010 inch larger than the diameter of a component lead adapted to be associated therewith.

8. The method defined in claim 6, wherein the exposed aluminum surfaces are plated to a thickness of approximately 0.004 inch.

9. The method defined in claim 6, wherein the surfaces are electroless copper plated to an approximate thickness of 0.0001 inch.

10. The method defined in claim 6, wherein the surfaces are electro copper plated to an approximate thickness of 0.0017 inch.

11. The method defined in claim 6, wherein the tubes are plated to a wall thickness of approximately 0.004 inch.

12. The method defined in claim 6, wherein sodium hydroxide is utilized to dissolve the aluminum sheet.

13. The method defined in claim 6, wherein the copper is removed from the positioned board by immersing the assembly in copper stripper solution.

14. The method of making tubes integral with a positioner board and with at least one circuit of conductive material comprising the steps of bonding together three layers of selected material, the middle layer of selected material having a thickness equal to the desired extended height of the tubes, forming apertures of predetermined configuration and number in the thus bonded layer assembly, electroless plating all surfaces with a suitable conductive material, electroplating all surfaces with a suitable conductive material to a desired thickness, forming a circuit on the outer surface of at least one outer layer of the assembly, electroplating with a conductive material certain surfaces including those defining the tube walls, removing the other outer layer of selected material and associated bonding and plating material, and removing the adjacent middle layer of selected material and associated bonding material thus leaving the tubes exposed and extending from the remaining layer of material.

References Cited

UNITED STATES PATENTS

| | | | |
|---|---|---|---|
| 3,209,066 | 9/1965 | Toomey et al. | 29—155.5 |
| 3,256,586 | 6/1966 | Douglas et al. | 29—625 |
| 3,345,741 | 10/1967 | Reimann | 29—626 |
| 2,692,190 | 10/1954 | Pritikin. | |
| 3,102,213 | 8/1963 | Bedson | 317—101 X |

WILLIAM I. BROOKS, *Primary Examiner.*